(12) United States Patent
Rizza

(10) Patent No.: US 6,913,644 B2
(45) Date of Patent: Jul. 5, 2005

(54) HEMP CONCRETE MIXTURES AND MORTARS, PREPARATIONS METHOD AND USES

(75) Inventor: Michel Rizza, Le Perreux-sur Marne (FR)

(73) Assignee: BCB, Chatillon le Duc (FR)

(*) Notice: Subject to any disclaimer, the term of this patent is extended or adjusted under 35 U.S.C. 154(b) by 0 days.

(21) Appl. No.: 10/481,327

(22) PCT Filed: Jun. 19, 2002

(86) PCT No.: PCT/FR02/02123

§ 371 (c)(1),
(2), (4) Date: Dec. 22, 2003

(87) PCT Pub. No.: WO03/004435

PCT Pub. Date: Jan. 16, 2003

(65) Prior Publication Data

US 2004/0129182 A1 Jul. 8, 2004

(30) Foreign Application Priority Data

Jun. 21, 2001 (FR) .......................................... 01 08437

(51) Int. Cl.[7] .......................... C04B 28/10; C04B 18/24; C04B 38/00
(52) U.S. Cl. ...................... 106/805; 106/730; 106/731; 106/795; 106/804
(58) Field of Search ................ 106/730, 731, 106/795, 804, 805

(56) References Cited

U.S. PATENT DOCUMENTS

| 1,961,525 A | | 6/1934 | Offutt |
| 2,156,310 A | | 5/1939 | Schuh |
| 4,369,201 A | * | 1/1983 | Kober ........................... 427/4 |
| 4,373,957 A | * | 2/1983 | Pedersen ..................... 106/711 |
| 4,400,217 A | * | 8/1983 | Kober ........................ 106/611 |
| 5,665,439 A | | 9/1997 | Anderson et al. |
| 2003/0066262 A1 | * | 4/2003 | Pulnam ..................... 52/731.1 |

FOREIGN PATENT DOCUMENTS

| DE | 744 316 C | | 1/1944 |
| DE | 2541983 A | * | 3/1977 |
| DE | 41 28 424 A | | 3/1993 |
| DE | 296 18 110 U | | 1/1997 |
| DE | 19643605 A1 | * | 4/1998 |
| EP | 1 069 090 A | | 1/2001 |
| FR | 2 754 532 A | | 4/1998 |
| FR | 2 784 374 A | | 4/2000 |
| JP | 52-51419 A | * | 4/1977 |
| JP | 06-157112 A | * | 6/1994 |

OTHER PUBLICATIONS

Derwent Abstract No. 1997–290036, abstract of Chinese Patent Specification No. 1103633A (Jun. 1995).*

Derwent Abstract No. 1997–311230, abstract of Chinese Patent Specification No. 1104614A (Jul. 1995).*

* cited by examiner

*Primary Examiner*—Anthony J. Green
(74) *Attorney, Agent, or Firm*—Rothwell, Figg, Ernst & Manbeck, P.C.

(57) ABSTRACT

The invention relates to concretes and mortars comprising a hydrophilic component such as hemp, flax or straw; a binder which sets in air through absorption of carbon dioxide after reduction in an aqueous phase; at least one additive which forms a microcapillary system array; and at least one matrix water repellency additive.

25 Claims, 5 Drawing Sheets

HEMP CONCRETE MIXTURES AND MORTARS, PREPARATIONS METHOD AND USES

CROSS REFERENCE TO RELATED APPLICATION

This application is a 35 USC § 371 National Phase Entry Application from PCT/FR02/02123, filed Jun. 19, 2002, and designating the U.S.

TECHNICAL FIELD OF THE INVENTION

This invention relates to the technical area of hemp concretes and mortars, that is, ones containing some of the analogue of hemp or hemp stalk and/or other components of hemp such as fibers, fibrils, dusts of hemp and powdered hemp, hereinafter referred to as "components".

These varieties of mortar and concrete are designed for all BTP (Building and Public Works) applications and to all domestic or other customary applications of concretes and mortars.

It is to be noted that a mortar is made up of a mixture of binder such as lime, cement, or the like and aggregate(s) such as sand, powdered stone, crushed marble, and the like with water. Such a mortar is used in construction to bind and/or to cover construction elements.

It is to be noted that concrete is an artificial agglomerate of pebbles, gravel, and sand combined by means of a binder, whether watery or not.

TECHNICAL PROBLEM POSED

Incorporation of derivatives of hemp in a concrete or mortar poses a very serious problem because of the highly hydrophilic nature of the "hemp" component. This component can absorb up to approximately 400 percent of its weight of water or water-based liquid, this introducing a very strong reaction competing with the water contained in the mortar or concrete.

As will be seen later, various techniques have been tried in the prior art to mitigate this serious disadvantage, but no success has been achieved in preventing the concrete and mortar obtained from exhibiting characteristics of drying, setting, and highly uncertain mechanical properties. This is not acceptable in such a field, since such disadvantages may include setting difficulties in setting, possibly even "broken" setting, failure of the concrete to dry or uncertain drying, and/or bad or uncertain mechanical properties and/or risk of repeated absorption of water of external origin (rain water, for example) accompanied by development of microorganisms, mouldinesss, low-temperature embrittlement, etc.

PRIOR ART

Varieties of hemp mortar or concrete in which the hemp component (especially the "tow") is used as an aggregate, in whole or in part, in preparations, has been known for a very long time, even since ancient times. The array of tools for preparation is universally known as well, as are also the suppliers of current products and the most modern product families.

The binders currently used are gypsum, lime (in this instance used as hydraulic binder), and cements, that is, hydraulic binders.

The importance of these products is represented by very good thermal and acoustic insulation combined with very good mechanical strength, including a component of interest from the viewpoint of resistance to compression and that of elastic return, this making it in fact a very good product adapted to seismic standards.

These products are used in the form of hemp bricks, paving stones, walls, and more or less light concrete and mortar blocks in all BTP and domestic applications.

However, they exhibit serious defects which a large part of the industry under consideration has not succeeded in overcoming, despite all its efforts. The industry under consideration consequently has adapted itself to well-known yet serious disadvantages such as the drying defect and similar defects.

A significant and recognized need consequently exists for concretes and mortars not marked by these significant, even serious defects or ones precluding use of such substances while their other excellent properties remain.

A particular need exists for renovation or rehabilitation of historic works and old buildings, an area in which concretes and mortars with hydraulic binder lead to in failures.

SUMMARY OF THE INVENTION

The invention relates to hemp mortars or concretes, that is ones including one or more hemp components in their formulation in which the binder is made up at least in part of what is termed "rich" lime, burnt lime in particular.

As is known, rich lime is a binder which sets in air through absorption of carbon dioxide ($CO_2$) after reduction in an aqueous phase, while the burnt lime is a binder which essentially contains calcium hydroxide, dolomitic lime containing a mixture of calcium hydroxide and magnesium hydroxide.

The rich lime may be used in various forms such as a paste, a powder, or, in the case of quicklime, in the form of the rock itself.

Use may be made of any desired mixtures of all types and all forms of rich lime.

The expert may consider and adapt these various combinations as a function of the specific application contemplated, his general knowledge, the present description, and optionally simple routine tests.

In one preferred embodiment the binder in question is made up of 20% to 90% by weight, preferably 50 to 80% by weight, rich lime and 20% to 40% by weight, preferably 10% to 70% by weight, hydraulic binder such as a hydraulic lime or a cement, and optionally 5% to 10% by weight binder and/or puzzolanic filler(s) of the volcanic ash type, "trass" (which is a volcanic rock well known to the expert), or any other component puzzolanic in nature, the total equaling 100%.

Lime exhibits quite significant specific features and constraints in comparison to the customary binders, plasters, and cements which have been used for decades.

First of all, particles of lime are very fine ones and result in a specific Blaine surface much superior to that of hydraulic binders.

It is to be noted, even though this is known to the expert, that the specific Blaine surface of lime is of the order of 8,000 to 20,000, while that of hydraulic binders is of the order of 2,700 to 5,000.

Next, its setting characteristics are radically different. While cements and plasters contain silicates, aluminates, and/or sulfates the effect of which in setting is represented by a crystallization phenomenon, the effect of lime in setting is represented by a carbonation reaction in which calcium hydroxide undergoes a series of reductions with water or the base aqueous fluid of the concrete or mortar. In the case of lime water acts as a simple vector of the necessary $CO_2$.

In addition, its solubility in water is only 1.7 g/l at 10–20° C.

One particular problem associated with use of lime, one which has been predictable, because of the difficulty in managing the water of the formulation effectively, as been the difficulty of achieving uniform behavior and especially good flow properties.

Another prejudice against use of rich lime has been the conception that rich lime could by definition act in a concrete or mortar only in the vicinity of air, that is, on the surface or at maximum depths of the order of 1 to 3 cm. The invention now proposes a solution which, against all expectations, eliminates this problem.

There has also been the legitimate fear of an overly long period required for thorough drying. Refer to FIG. 1A attached, which shows that this fear has been fully justified.

The invention has overcome these prejudices and has solved the previous problems as a result of a special formulation which incorporates the special and innovative characteristics of porosity and capillarity. Some of the many problems posed, such as caking, had already been solved in the prior art, but never in the context of use of hemp as a component, which use represents a totally innovative functional approach, as is to be indicated in what follows.

DETAILED DESCRIPTION OF THE INVENTION

The invention accordingly relates to new formulations for "hemp" concretes and mortars, that is, ones including at least one "component" (in the broad sense indicated in the foregoing) of hemp and/or flax and/or straw such as rinds of oats or rice and/or generally speaking any comparable hydrophilic substance, including optionally a synthetic substance, individually or in a mixture or mixtures, for the sake of simplification referred to in what follows, including the claims, as "hemp" concretes or mortars.

Hence the invention relates to new formulations for "hemp" concretes and mortars, that is, ones including at least one component of hemp as specified in the foregoing and technically equivalent components which comprise the conventional ingredients of mortars and concretes except in the respect that the binder is made up, in whole or in part, of rich lime optionally in various combinations of types and forms of lime as indicated in the foregoing, and in that they also comprise (a) at least one additive for formation of very fine pores and capillaries and (b) at least one matrix water repellency additive.

The term "matrix water repellency" is to be understood here to mean that the mass which encloses the fibers, particles, etc of hemp is subjected to the water repellent action of the additive.

It is to be noted that the hemp itself is subject to this action, but without exerting an effect, since the hemp absorbs the water and is not made water-repellent because it contains water; on the contrary, after elimination of the water, the water repellency exerts its effect and the hemp no longer absorbs water, for example, it absorbs neither moisture nor rain water, etc. This is one of the major advantages of the invention.

The term "formation of very fine pores and capillaries" is used here to designate formation of a highly complex array whose structure may vary from one formulation to the other but which comprises open and/or closed tubular capillaries, as well as closed microbubbles or microspaces and/or closed microcavities, closed tubes among others, arranged, proportioned, and distributed so that the final concrete or mortar exhibits uniform or more or less uniform characteristics and has no setting or drying defects or uncertain properties, that is, properties of arrangement, proportioning, and distribution such that the matrix water may be evacuated toward the surface during setting and then drying, while after drying external water (rain) cannot penetrate the network of capillaries.

For the sake of simplification of reading this complex array will be designated in what follows, including the claims, as a "microcapillary system".

The expert, who is thoroughly familiar with the problems of setting and drying of hydraulic concretes and mortars and with the characteristics which he must produce in order to formulate a "good" concrete or mortar, and who also is familiar with the difficulties and disadvantages of hemp mortars and concretes, will encounter no difficulty in controlling the microcapillary system claimed for the invention, especially on the basis of the percentage of rich lime, in the light of the following description and examples, and in relying on his personal general knowledge, and if necessary on a few routine tests, for the purpose of adaptation to the specific application considered.

In one preferred embodiment the additive for formation of the microcapillary system comprises one or more plant and/or mineral colloid.

In another preferred embodiment the additive for formation of the microcapillary system is suitable for arriving at a capillarity of the order of 5 to 15 Ångströms, preferably 8 to 10 Ångströms.

In comparison, hemp or flax exhibits a capillarity which is 3 to 5 times greater, while a hydraulic binder yields a capillarity of the order of as much as 10 to 20 times greater.

In another preferred embodiment this additive for formation of the microcapillary system is suitable for provision of the microcapillary system in question with closed tubes and/or masses and/or spaces and/or microbubbles and/or microcavities, closed tubes in particular.

While not wishing to be bound to any theory, the Applicant believes that such closed spaces, closed tubes in particular, are capable (optionally when combined with open microcapillaries) of extracting the water contained in the hemp and enabling it to migrate toward the surface in the form of water as liquid and then water vapor, which ultimately is propagated to the exterior.

In another, non-restrictive, preferred embodiment the colloids selected are among the plant colloids such as alginates and/or polysaccharides and all derivatives of natural or synthetic starches and/or carragheenates.

Mention may be made in particular of guar hydroxypropyl (polysaccharide family), which has yielded the best results.

Good results have also been obtained with the carragheenates (which are products similar to alginates) and with calcium alginate.

On the contrary, the alginates of sodium and magnesium have a tendency to precipitate and are not recommended.

Other microcapillary system formation additives are to be selected from among the following:
etherified galactomannan, and
etherified derivatives of guars
and mixtures of these substances.

In one preferred embodiment such water repellency additive comprises at least one water-repellent agent and one surfactant agent.

While not wishing to be bound to any theory, the Applicant believes that the surfactant contributes a "netting" or "mesh" structure which contributes greatly to uniformity of the final product and its properties.

In one alternative embodiment use is to be made of a surfactant for a neutral or basic medium and/or a surfactant for an acid medium, and/or appropriate mixtures of these substances, as a function of the anticipated evolution of the pH (which any expert is familiar with and can evaluate).

In one preferred, non-restrictive, embodiment the surfactant or surfactants selected are among the polysulfonates of calcium, sodium, or magnesium and in particular among the lignosulfonates.

In another preferred, non-restrictive, embodiment another surfactant or other surfactants to be selected is/are among the following:
sodium sulfates.

In one preferred embodiment the water-repellent agents selected preferably are among the metallic soaps, the maleates, oleates, stearates, and the like of aluminum, magnesium, sodium, lithium, and similar salts, and/or siliconates of sodium and mixtures of such siliconates.

In one preferred, non-restrictive, embodiment the water-repellent agent(s) selected is/are among the following:
oleates of sodium.

In one preferred, non-restrictive, embodiment the additives and agents employed in accordance with the invention are to be employed in the following proportions.

(a) additive for formation of the microcapillary system: 0.1% to 2% of the total weight of the binder
(b) water-repellent additive: 0.1% to 1% of the total weight of the binder
(c) surfactant 0.002% to 0.2% of the total weight of the binder A new industrial product is thereby obtained which is characterized in that it consists of mortars and concretes with a hemp binder component comprising rich lime, comprising (a) at least one additive for formation of very fine pores and capillaries
and
(b) at least one water repellent additive, and
the setting, mechanical properties, and drying of which are not marked by uncertain behavior.

The invention also relates to a new industrial product of the mortar and concrete type with a hemp binder component of rich lime, characterized in that it includes in its mass a microcapillary system which itself comprises tubes and/or masses and/or spaces and/or microcavities, in particular closed tubes capable, especially closed tubes (optionally combined with open microcapillaries), of extracting water previously absorbed and contained in the hemp and of enabling it to migrate toward the surface in the form progressively of water and then of water vapor which ultimately spreads outward to the point of drying.

This product is also characterized in that its water-repellent matrix renders the dry fibers of the hemp component water repellent, thereby preventing reabsorption of the water by the hemp component.

In another alternative this product is characterized in that its global or "residual" thermal conductivity coefficient lambda is of the order of 0.8 to 0.12, preferably around 0.1.

It is to be noted by way of comparison that the thermal conductivity coefficient of a hydraulic concrete or mortar is of the order of 0.6 to 1.15, that is, around five to eleven times higher.

Such products would be products used in the BTP (Construction and Public Works), ones such as perpends, cutting blocks and blocks of various shapes, bricks, and the like well known to the expert, for the sake of simplification hereinafter referred to as "perpends" as well as slabs, wall linings, floors, ceilings, etc, and the like well known to the expert.

BRIEF DESCRIPTION OF THE DRAWINGS

Other characteristics and advantages of the invention will be better understood by reading the following description in conjunction with the attached drawing, in which FIG. 1, which consists of FIGS. 1A (left) and 1B (right) represents a photograph of two samples (20×30×60 cm) of hemp concrete.

in the figure on the left (1A): concrete not based on the invention (comparative test), made with a mixture of plaster and rich lime (white area: excessively long drying time and development of mold fungus)

in the figure on the right (1B): concrete made with a mixture as specified for the invention

Figure 1:
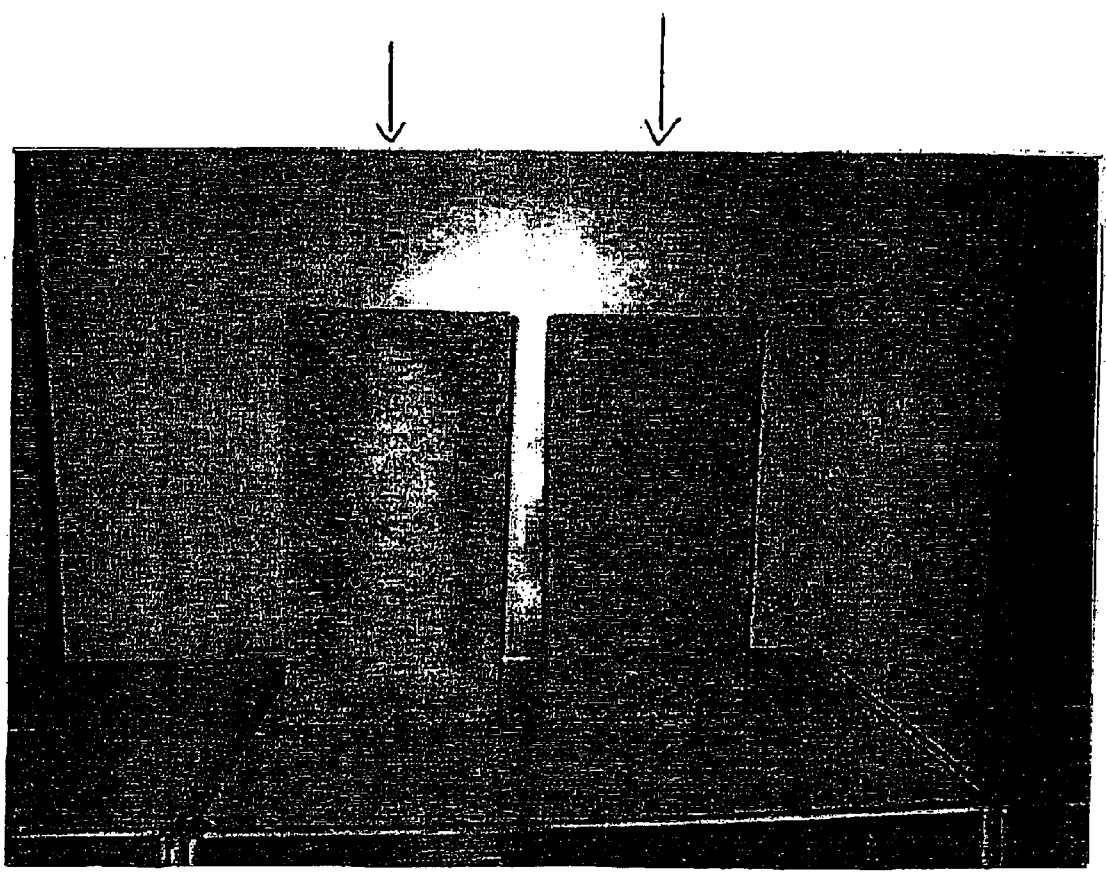
Figure 2:
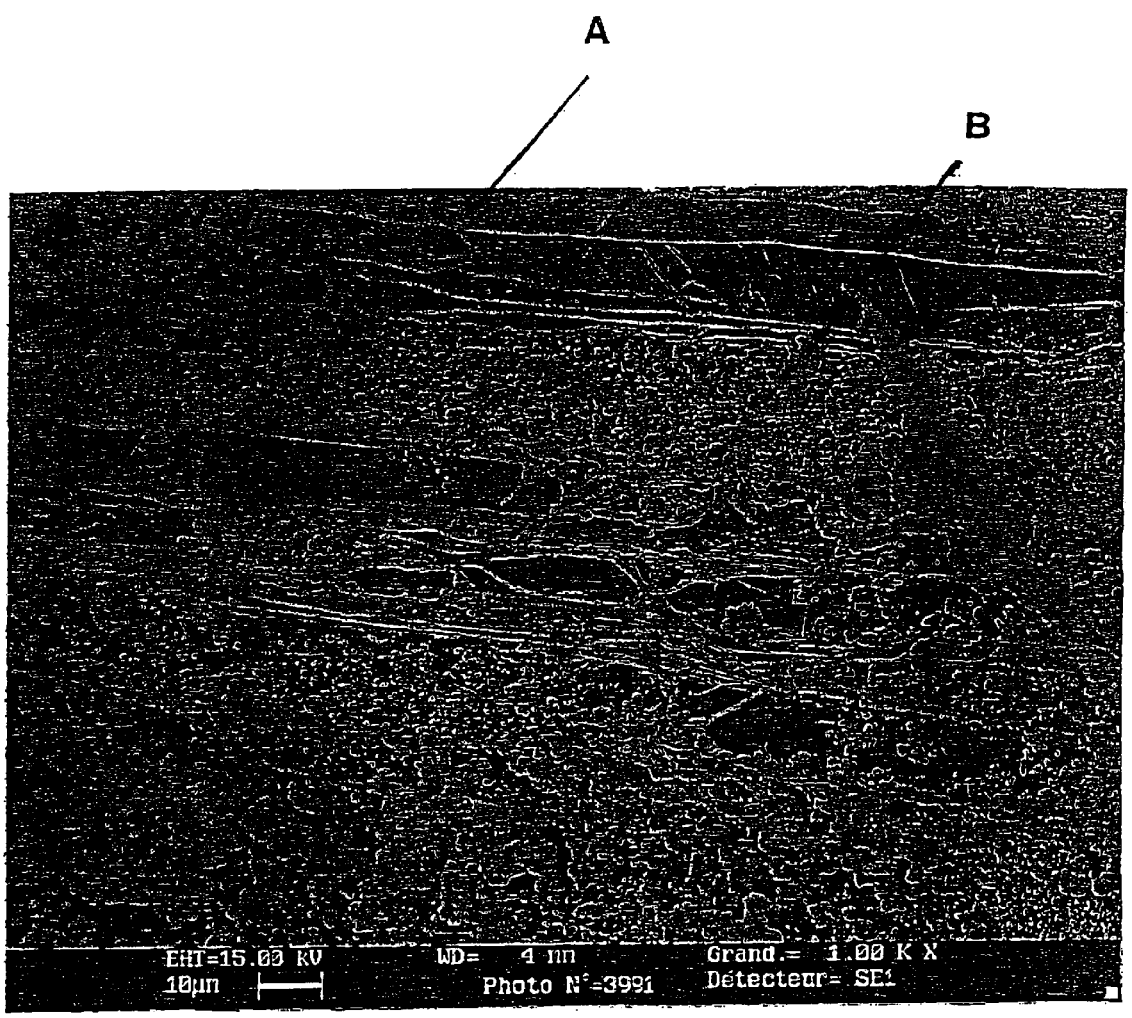
FIG. 2 presents a scanning electron microscope photograph of a lime mortar on a hemp granulate (×1,000). The relationship between hemp (A) and hemp (B) is clearly shown. The grains of lime are lodged as far as in the interior of the fiber channels of the plant.
Figure 3:
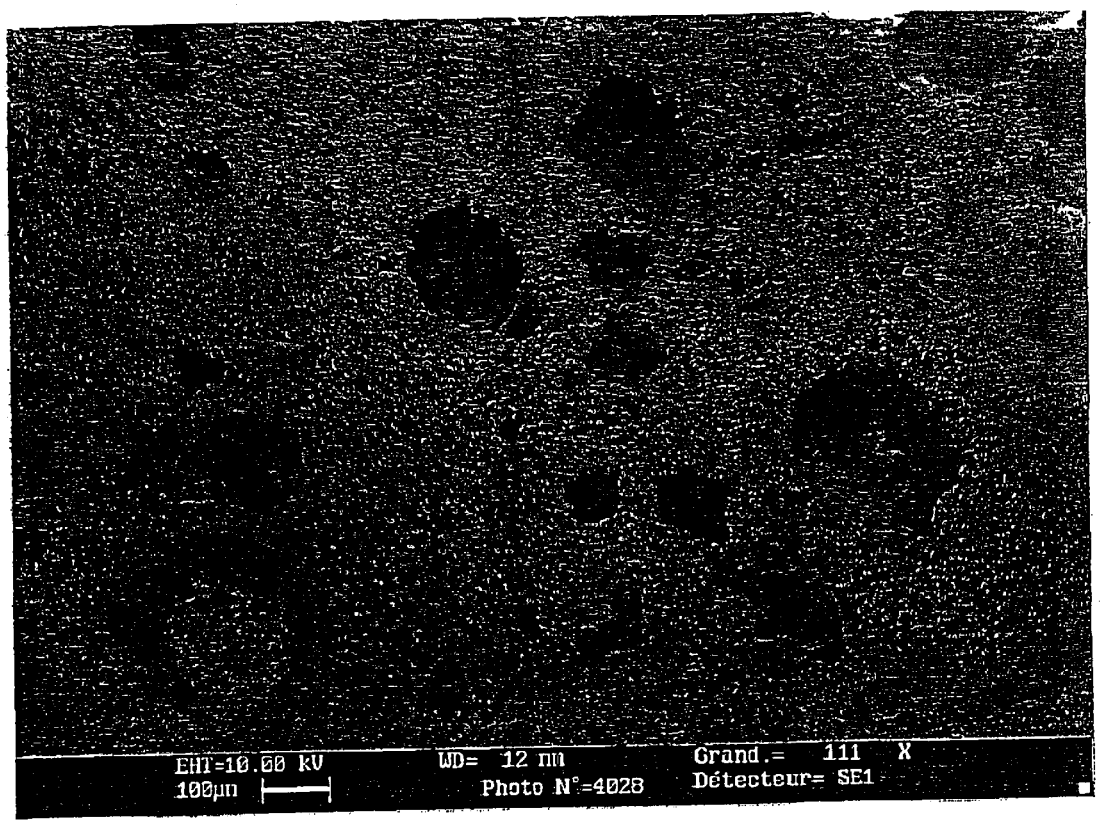
FIG. 3 presents a scanning electron microscope photograph showing bubbles and microbubbles of air and openings of tubular channels in the lime paste (×111). The porosity of the lime paste is represented by air bubbles and tubular channels which have formed after evaporation of the mixing water.
Figure 4:
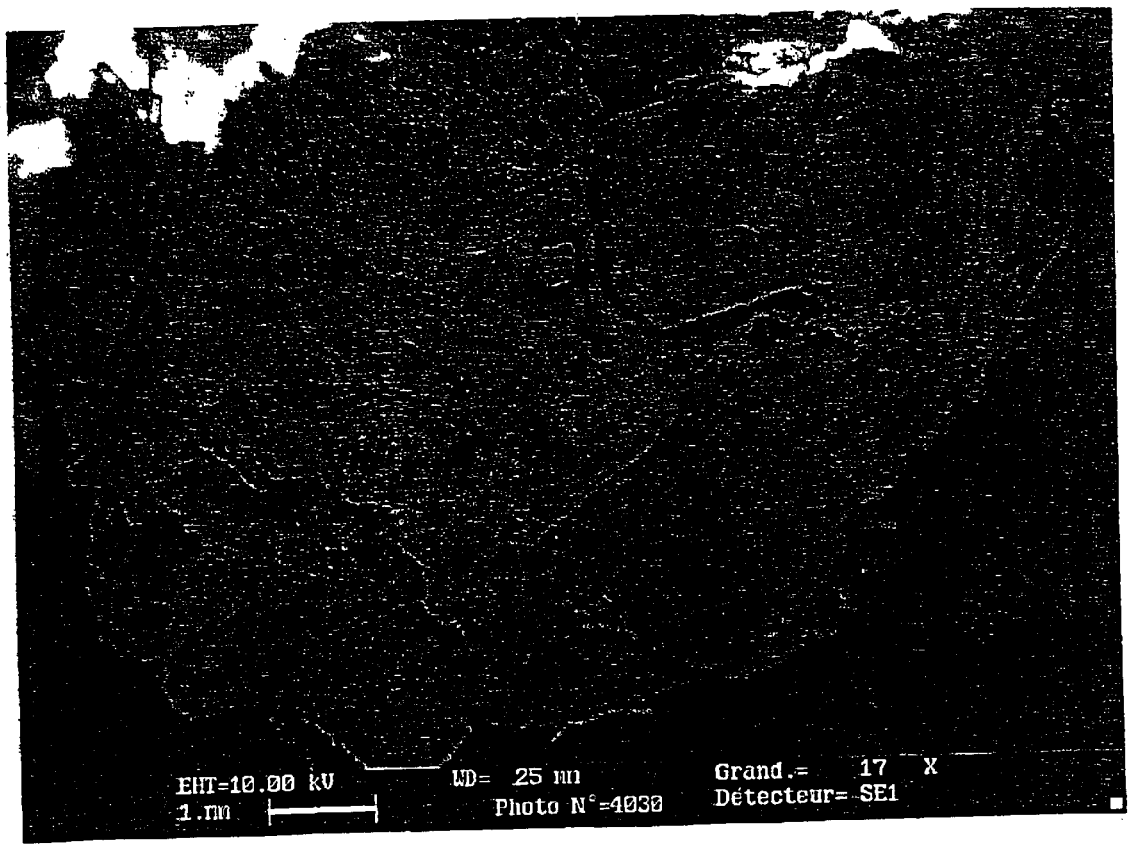
FIG. 4 presents a scanning electron microscope photograph showing a network of air bubbles and tubular channels (×17). The photograph shows with great clarity the complete envelopment achieved in accordance with the invention, an amalgam of tubes, closed tubes (some of which are visible because they are cut off outside the cut), spaces or masses, capillaries, and the hemp cuttings.
Figure 5:
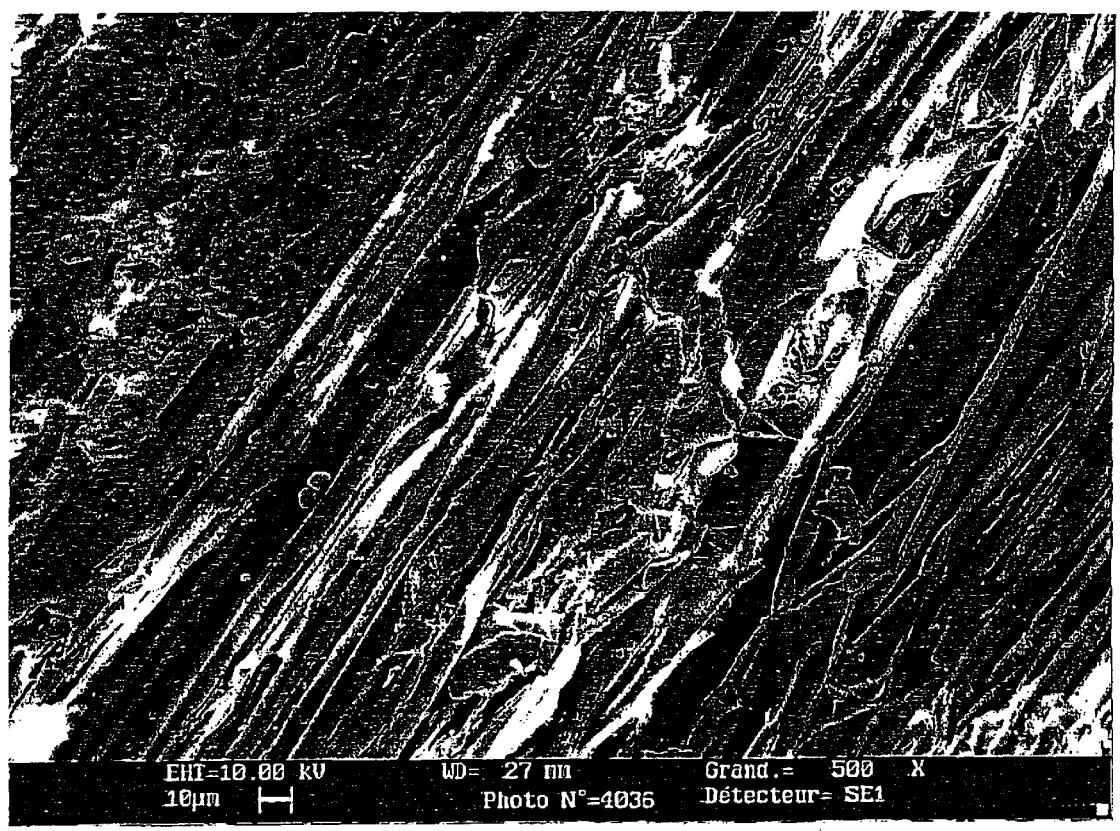
FIG. 5 presents a comparable hemp structure WITHOUT the lime component.

Microscopic examination of FIGS. 2 to 5 reveals the presence, as claimed for the invention, of a significant capillary network made up of air bubbles and tubular channels.

The invention relates to formulations of "hemp" concretes and mortars with a binder including lime, as well as to new industrial products consisting of such mortars and concretes, and also to use as additives for "hemp" mortars and concretes of the additive for formation of the microcapillary system and/or the water repellency additive, as well as products made by means of such mortars and concretes or formulation or by means of the additive for formation of the microcapillary system and/or the water repellency additive, such as bricks, blocks, perpends, various "hemp" elements, and also products for Building and Public Works or individual structures erected by means of such mortars or concretes, additives or products, such as walls, slabs, covers, linings and coatings of floors, ceilings, walls, partitions, and similar structures.

The invention also covers all embodiments and all applications which will be immediately comprehensible to the expert upon reading this application, on the basis of his own knowledge and optionally simple routine tests.

What is claimed is:

1. A formulation for concretes and mortars, comprising
   (a) a hydrophilic component selected from the group consisting of hemp, flax and straw;
   (b) a binder comprising lime which sets in air through absorption of carbon dioxide after reduction in an aqueous phase,
   (c) at least one additive which results in the formation of a microcapillary system array which comprises open and/or closed tubular capillaries, closed microspaces, closed microcavities and/or closed tubes suitable in arrangement and in proportion and distribution for ensuring that any matrix water can be evacuated to a surface on setting and then drying, while, after drying, water cannot penetrate said microcapillary system array, wherein said additive is selected from the group consisting of one or more plant colloids, mineral colloids, etherified galactomannan, and etherified derivatives of guars, and
   (d) at least one matrix water repellency additive which prevents said hydrophilic component from reabsorbing water after drying.

2. The formulation according to claim 1, wherein the additive which results in the formation of the microcapillary system array comprises one or more plant and/or mineral colloids.

3. The formulation according to claim 1, wherein the additive which results in the formation of the microcapillary system array results in a capillarity of the order of 5 to 15 Ångströms.

4. The formulation according to claim 3, wherein said capillarity is of the order of 8 to 10 Ångströms.

5. The formulation according to claim 2, wherein said additive which results in the formation of the microcapillary system array results in closed tubes, closed masses, closed spaces, closed microbubbles and/or closed microcavities.

6. The formulation according to claim 5, wherein said additive which results in the formation of the microcapillary system array results in closed tubes.

7. The formulation according to claim 2, wherein said plant colloids are selected from the group consisting of alginates, polysaccharides, derivatives of natural starches, derivatives of synthetic starches, and carragheenates.

8. The formulation according to claim 7, wherein said polysaccharides are colloids of hydroxypropyl guar.

9. The formulation according to claim 7, wherein said plant colloids are carragheenates in combination with calcium alginate.

10. The formulation according to claim 2, wherein said additive which results in the formation of the microcapillary system array is at least one additive selected from the group consisting of etherified galactomannan and etherified derivatives of guars.

11. The formulation according to claim 1, wherein said matrix water repellency additive comprises at least one water repellent agent and one surfactant agent.

12. The formulation according to claim 11, wherein said surfactant is selected from the group consisting of a surfactant suitable for use in a neutral medium, a surfactant suitable for use in an acid medium, and a mixture of surfactants suitable for use in neutral or acid mediums.

13. The formulation according to claim 12, wherein said surfactant is at least one surfactant selected from the group consisting of polysulfonates of calcium, polysulfonates of sodium, polysulfonates of magnesium, and lignosulfonates.

14. The formulation according to claim 12, further comprising sodium sulfate.

15. The formulation according to claim 1, wherein said matrix water repellency additive is selected from the group consisting of metallic soaps; maleates, oleates, and stearates of aluminum, magnesium, sodium, and/or lithium; siliconates of sodium; and mixtures thereof.

16. The formulation according to claim 15, wherein said matrix water repellency additive is an oleate of sodium.

17. The formulation according to claim 11, wherein said additive for the formation of a microcapillary system array is 0.01% to 2% of the total weight of the binder, said water repellent additive is 0.1% to 1% of the total weight of the binder, and said surfactant agent is 0.002% to 0.2% of the total weight of the binder.

18. The formulation according to claim 1, wherein said lime is burnt lime which comprises calcium hydroxide and magnesium hydroxide.

19. The formulation according to claim 1, wherein said binder comprises 20–90% by weight lime and 10–70% by weight hydraulic binder.

20. The formulation according to claim 19, further comprising 5–10% by weight of a puzzolanic component.

21. The formulation according to claim 1, wherein said binder comprises 50–80% by weight lime and 20–40% by weight hydraulic binder.

22. An industrial product comprising concrete and/or mortar, wherein said concrete or mortar comprises
  (a) a hydrophilic component selected from the group consisting of hemp, flax and straw;
  (b) a binder comprising lime which sets in air through absorption of carbon dioxide after reduction in an aqueous phase,
  (c) at least one additive which results in the formation of a microcapillary system array which comprises open and/or closed tubular capillaries, closed microspaces, closed microcavities and/or closed tubes suitable in arrangement and in proportion and distribution for ensuring that any matrix water can be evacuated to a surface on setting and then drying, while, after drying, water cannot penetrate said microcapillary system array, wherein said additive is selected from the group consisting of one or more plant colloids, mineral colloids, etherified galactomannan, and etherified derivatives of guars, and
  (d) at least one matrix water repellency additive which prevents said hydrophilic component from reabsorbing water after drying.

23. The industrial product according to claim 22, wherein said product has a thermal conductivity coefficient lambda of the order of 0.08 to 0.12.

24. The industrial product according to claim 23, wherein said thermal conductivity coefficient lambda is around 0.1.

25. A method for making bricks, blocks, perpends, wall elements, slabs, linings, covers, coatings for floors, ceilings, walls, partitions, or individual structures, comprising preparing concrete and/or mortar which comprises
  (a) a hydrophilic component selected from the group consisting of hemp, flax and straw;
  (b) a binder comprising lime which sets in air through absorption of carbon dioxide after reduction in an aqueous phase,
  (c) at least one additive which results in the formation of a microcapillary system array which comprises open and/or closed tubular capillaries, closed microspaces, closed microcavities and/or closed tubes suitable in arrangement and in proportion and distribution for ensuring that any matrix water can be evacuated to a surface on setting and then drying, while, after drying, water cannot penetrate said microcapillary system array, wherein said additive is selected from the group consisting of one or more plant colloids, mineral colloids, etherified galactomannan, and etherified derivatives of guars, and
  (d) at least one matrix water repellency additive which prevents said hydrophilic component from reabsorbing water after drying, and
forming said concrete and/or mortar into bricks, blocks, perpends, wall elements, slabs, linings, covers, coatings for floors, ceilings, walls, partitions, or individual structures.

* * * * *